US011789862B2

(12) United States Patent
Muchherla et al.

(10) Patent No.: US 11,789,862 B2
(45) Date of Patent: *Oct. 17, 2023

(54) POWER-ON-TIME BASED DATA RELOCATION

(71) Applicant: Micron Technology, Inc., Boise, ID (US)

(72) Inventors: Kishore Kumar Muchherla, Fremont, CA (US); Renato C. Padilla, Folsom, CA (US); Sampath K. Ratnam, Boise, ID (US); Saeed Sharifi Tehrani, San Diego, CA (US); Peter Feeley, Boise, ID (US); Kevin R. Brandt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,794

(22) Filed: Jun. 7, 2022

(65) Prior Publication Data

US 2022/0300415 A1 Sep. 22, 2022

Related U.S. Application Data

(63) Continuation of application No. 16/175,579, filed on Oct. 30, 2018, now Pat. No. 11,379,355.

(51) Int. Cl.
*G06F 12/02* (2006.01)
*G06F 12/121* (2016.01)
*G06F 3/06* (2006.01)

(52) U.S. Cl.
CPC ........ *G06F 12/0246* (2013.01); *G06F 3/0614* (2013.01); *G06F 3/0646* (2013.01); *G06F 3/0683* (2013.01); *G06F 12/121* (2013.01)

(58) Field of Classification Search
CPC .. G06F 12/0246; G06F 3/0614; G06F 3/0646; G06F 3/0683; G06F 12/121; G06F 3/0616; G06F 3/064; G06F 3/0679
(Continued)

(56) References Cited

U.S. PATENT DOCUMENTS 10,417,123 B1* 9/2019 Souri ................. G06F 12/0253
2007/0028124 A1 2/2007 Resnick et al.
(Continued)

FOREIGN PATENT DOCUMENTS

KR 10-2009-012941 A 12/2009

OTHER PUBLICATIONS

International Search Report and Written Opinion for International Application No. PCT/US2019/058658, dated Feb. 18, 2020, 10 pages.

*Primary Examiner* — David Yi
*Assistant Examiner* — Zubair Ahmed
(74) *Attorney, Agent, or Firm* — Lowenstein Sandler LLP (57) ABSTRACT

A total estimated occupancy value of a first data on a first data block of a plurality of data blocks is determined. To determine the total estimated occupancy value of the first data block, a total block power-on-time (POT) value of the first data block is determined. Then, a scaling factor is applied to the total block POT value to determine the total estimated occupancy value of the first data block. Whether the total estimated occupancy value of the first data block satisfies a threshold criterion is determined. Responsive to determining that the total estimated occupancy value of the first data block satisfies the threshold criterion, data stored at the first data block is relocated to a second data block of the plurality of data blocks.

20 Claims, 5 Drawing Sheets

(58) Field of Classification Search
USPC .................................................. 711/103, 102
See application file for complete search history.

(56) References Cited

U.S. PATENT DOCUMENTS

| | | | |
|---|---|---|---|
| 2008/0279005 A1* | 11/2008 | France | G11C 16/3418 365/185.11 |
| 2011/0283051 A1* | 11/2011 | Lieber | G06F 11/1417 711/102 |
| 2013/0268136 A1 | 10/2013 | Cox et al. | |
| 2013/0332791 A1 | 12/2013 | Chu | |
| 2014/0059405 A1* | 2/2014 | Syu | G11C 16/04 711/E12.008 |
| 2014/0181585 A1 | 6/2014 | Hoang et al. | |
| 2015/0135027 A1 | 5/2015 | Yanamanamanda et al. | |

\* cited by examiner

POWER-ON-TIME BASED DATA RELOCATION

RELATED APPLICATIONS

This application is a continuation of U.S. patent application Ser. No. 16/175,579, filed Oct. 30, 2018, the entire contents of which are hereby incorporated by reference herein.

TECHNICAL FIELD

Embodiments of the disclosure relate generally to memory sub-systems, and more specifically, relate to relocating data stored on a data block of a memory sub-system based on a power-on-time.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to relocating data stored on a data block based on a power-on-time of a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A memory component in a memory sub-system can include memory cells that can include one or more memory pages (also referred to herein as "pages") for storing one or more bits of binary data corresponding to data received from the host system. One or more memory cells can be grouped together to form a data block to store data in the memory component. As memory cells store data in a form of charges, they may lose charge over time due to a change in an external environment (e.g., a temperature) and/or a number of program and erase cycles (hereinafter, "P/E cycles") operated on the respective memory cell. Such charge loss could lead to a shift in a threshold voltage and thus, result in an incorrect reading of stored data in memory cells and thus, data blocks in the memory component.

Conventionally, the memory sub-system would periodically (e.g., whenever the memory sub-system is powered on or on a daily basis) scan data stored in each data block in order to determine whether or not data needs to be relocated (e.g., whether there is enough space left in the respective data block) to a new data block of the memory sub-system. The more frequently the scan operation is performed, there would be a higher chance of data being relocated. Thus, such a data relocation plan would unnecessarily involve a high number of P/E cycles. In addition, such a data relocation plan does not accurately take into account how long data has been stored because a large amount of data can be written at once on a data block (in which case, the charge loss experienced by a memory cell may not become problematic until a longer period of time has passed). Accordingly, a conventional memory sub-system that scans data every time the memory sub-system is powered on or on a daily basis and relocates data upon a condition being fulfilled may lead to a significant number of wasteful P/E cycles per year. Therefore, the conventional approach to data relocation can be undesirable, because each memory component has a finite number of P/E cycles available. Each P/E cycle can exhaust a memory component a certain amount and after a certain number of cycles, the memory component can be worn out and become unusable. Therefore, the more frequently that P/E cycles are used for data relocation, the shorter the lifetime of the memory sub-system becomes.

Aspects of the present disclosure address the above and other deficiencies by having a memory sub-system that relocates data based on an estimated occupancy time period of data stored on a page (e.g., a first or last page) of data blocks using a power-on-time of the memory sub-system to minimize the number of P/E cycles used for data relocation. In one embodiment, the memory sub-system can determine a total estimated occupancy value of a data block of one or more data blocks in the memory sub-system. The total estimated occupancy value can also be called as a total estimated occupancy time, total estimated lifetime value, or any other suitable names that refer to the estimated occupancy time period of data stored on a page of a data block. To determine the total estimated occupancy value of the data block, the memory sub-system can determine a total block power-on-time value of the data block and apply a scaling factor to the total block power-on-time value. Then, the memory sub-system can determine whether the total estimated occupancy value of the data block satisfies a threshold criterion (e.g., whether the total estimated occupancy value of the data block exceeds a predetermined threshold (e.g., 2 months)) and if so, relocate data (i.e., entire data) stored on the data block to another data block. By being able to estimate how long data has been stored and set a limit to how frequently (e.g., 2 months) data relocation should be performed, such a memory sub-system can significantly reduce the number of P/E cycles used in relocating data from approximately 300 P/E cycles or more (when relocating data everyday), for example, to about 6 P/E cycles per year (i.e., every 2 months for 12 months). Accordingly, the memory sub-system in accordance with the present disclosure can lengthen the lifetime of the memory sub-system and reduce and/or save an amount of processing resources used for data relocation when compared to the conventional memory sub-system.

Figure 1:
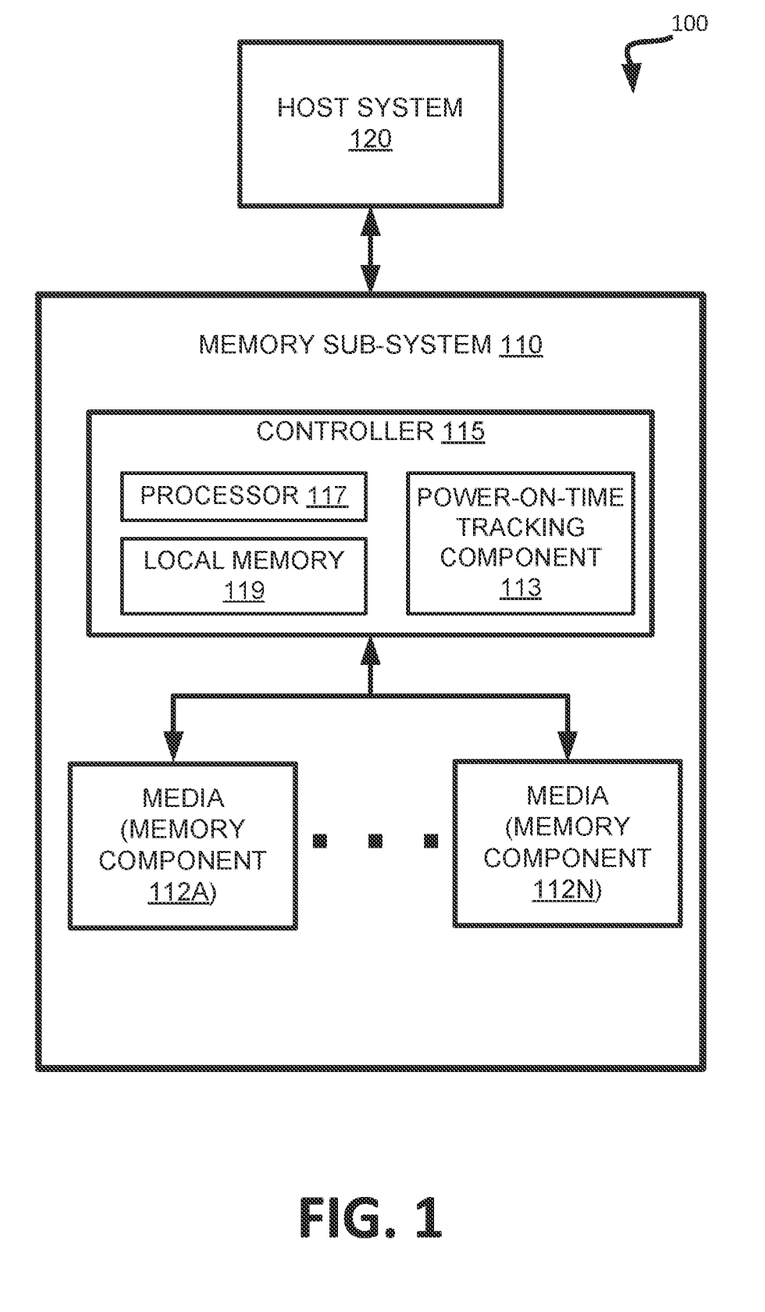
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. For example, the local memory 119 can store any values determined in computing total occupancy values of data blocks. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a power-on-time (POT) tracking component 113 that can be used to relocate data stored at a data block across one or more memory components 112A to 112N based on a POT value of the memory sub-system 110. In some embodiments, the controller 115 includes at least a portion of the POT tracking component 113. For example, the controller 115 can include a processor 117 (a processing device) configured to execute instructions stored in local memory 119 for performing the operations described herein. In some embodiments, the POT tracking component 113 is part of the host system 120, an application, or an operating system.

The POT tracking component 113 can determine a total estimated occupancy value of a first data block of multiple data blocks on one of memory components 112A to 112N. The POT tracking component 113 can determine whether the total estimated occupancy value of the first data block satisfies a threshold criterion (e.g., exceeds a predetermined threshold). Responsive to determining that the total estimated occupancy value of the first data block satisfies a threshold criterion, the POT tracking component 113 can relocate all the data stored at the first data block to a second data block of the multiple data blocks. Further details with regards to the operations of the POT tracking component 113 are described below.

Figure 2:
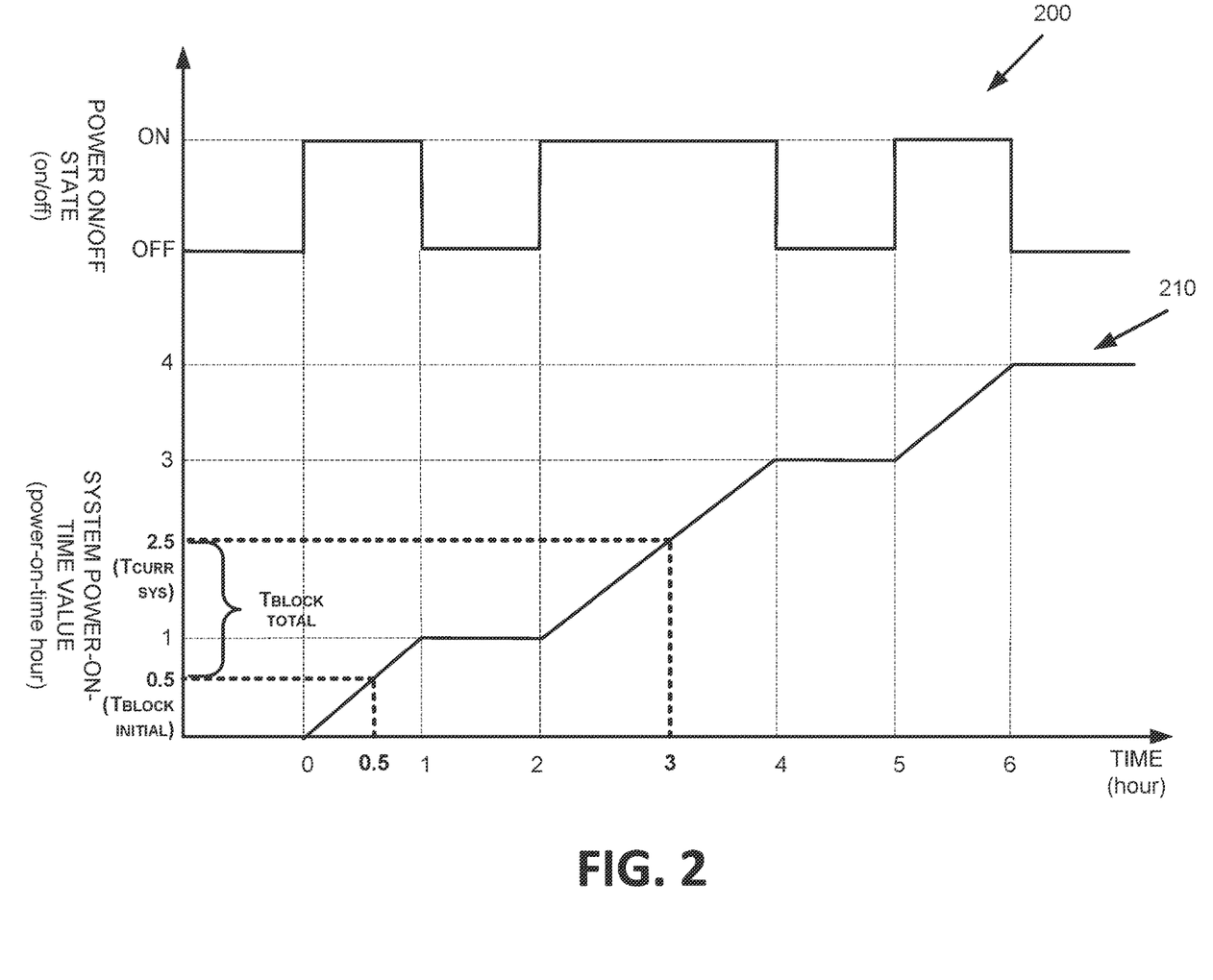
FIG. 2 is a graph illustrating an example of power-on and power-off states of a memory sub-system and a corresponding system power-on-time value in accordance with some embodiments of the present disclosure.

FIG. 2 is a graph illustrating an example of power-on and power-off states of the memory sub-system 110 and a corresponding system POT value in accordance with some embodiments of the present disclosure. Graph 200 represents power-on and power-off states of the memory sub-system 110 and graph 210 depicts a change in a system POT value in accordance with changes to the power-on and power-off states. The memory sub-system 110 can be in a power-on state as a power source (e.g., an AC power source, a battery, or the like) initiates supplying power to the memory sub-system 110 (i.e., upon an occurrence of a power-on event). On the other hand, the memory sub-system 110 can be in a power-off state as the power source stops supplying power to the memory sub-system 110 (i.e., upon an occurrence of a power-off event). For example, the memory sub-system 110 can be powered on during normal working hours (e.g., 9 a.m. to 5 p.m.) and off afterwards. As another example, the memory sub-system 110 may be powered-on and off during the normal working hours. For instance, as illustrated in FIG. 2, the memory sub-system may be powered-on for an hour (e.g., hour 0 to hour 1), off for another hour due to a meeting (e.g., hour 1 to hour 2), back on for two hours (e.g., hour 2 to hour 4), off for an hour break (e.g., hour 4 to hour 5), and back on (e.g., hour 5 to hour 6).

A system POT value for graph 210 is a value in a unit of time (e.g., an hour) and is determined from a POT timer. The POT timer can count a period of time (e.g., seconds, minutes, hours, etc.) in which power from the power source is supplied to the memory sub-system 110, in terms of the system POT value illustrated in the graph 210. The POT timer would increment the system POT value only during the period of time the memory sub-system 110 is in the power-on state (e.g., when the power is supplied to the memory sub-system 110). The POT timer can be maintained by POT tracking component 113 and can be connected to the memory sub-system 110 and the power source (e.g., an AC power source or the like) of the memory sub-system 110. The POT tracking component 113 can continuously operate the POT timer while power is supplied from the power source (including when the memory sub-system 110 operates in a low power mode). When the power is no longer supplied by the power source (i.e., in case of a power-off state or shut-down mode), the POT tracking component 113 can determine the current system POT value measured or counted at the POT timer and store the system POT value in a data store (e.g., the local memory 119). On the other hand, when the power is being supplied by the power source (i.e., in case of a power-on state), the POT tracking component 113 can access the data store to determine the latest system POT value stored and enable the POT timer to resume counting or incrementing from the latest system POT value provided. In another embodiment, the POT timer can be connected to each memory component 112A-112N and a power source of each memory component 112A-112N. Accordingly, the system POT value could represent a POT value for each memory component 112A-112N.

Continuing from the example above and as illustrated in FIG. 2, when the memory sub-system 110 is in power-on state for an hour (e.g., hour 0 to hour 1), the system POT value could increase from POT hour 0 to POT hour 1. The memory sub-system could cause the POT timer to count as the memory sub-system is being powered on. When the memory sub-system 110 is powered off for the meeting (e.g., during hour 1 to hour 2), the system POT value remains unchanged. However, when the memory sub-system 110 is back into the power-on state during hour 2 to 4, the system POT value would increase from POT hour 1 to POT hour 3, proportionately. In case the memory sub-system 110 is powered off during the break between hour 4 to hour 5, the system POT value remains at POT hour 3. When the memory sub-system 110 is powered back on for hour 5 to hour 6, the system POT value is again incremented from POT hour 3 to POT hour 4. As such, the system POT value of the memory sub-system 110 is incremented (i.e., counted) when the system is powered on and is not incremented (i.e., remains the same) when the system is powered off.

The memory sub-system 110 can utilize the system POT value in estimating how long data (e.g., the data that was written on a data block (i.e., on a first page of the data block) for the first time) has been stored on a data block (i.e., a total estimated occupancy value) in order to determine whether or not to relocate the data. In one embodiment, the memory sub-system 110 can determine the total length of POT hours the data has been stored (i.e., total block POT value ($T_{BLOCK\ TOTAL}$)) and multiply by a scaling factor that represents a typical POT of the memory sub-system 110. For example, the memory sub-system 110 may determine that data on a data block has been stored for 2 POT hours. Given that the memory sub-system 110 is likely to be powered on 8 hours a day, the memory sub-system 110 can use a scaling factor of 3 (e.g., a ratio of a total amount of time in a day (i.e., 24 hours) to an expected amount of time during which the memory sub-system 110 is powered on (e.g., 8 hours)—that is, a ratio of 24 to 8 is 3). Accordingly, the memory sub-system 110 can determine approximately that the data has been stored on the data block for about 6 hours (i.e., 2 POT hours multiplied by the scaling factor of 3)—the total estimated occupancy value of the data block as 6 hours. As another example, the scaling factor can be a ratio of an expected amount of time for which the system is powered on during the day to a total amount of time in a day (i.e.—that is a ratio of 8 to 24 is 1/3). To determine the total estimated occupancy value of the data block, the total block POT value can be divided by the scaling factor (i.e., 2 POT hours divided by the scaling factor of 1/3 is 6 hours). Continuing from the above example, in one embodiment, the memory sub-system 110 can use a threshold criterion that requires a total estimated occupancy value of a data block to be at least 1440 hours (i.e., 2 months), or use the 1440 hours as a predetermined threshold (i.e., a minimum threshold) to decide whether or not to relocate data. In such a case, the memory sub-system 110 can determine not to relocate the data as the total estimated occupancy value of the data (i.e., 6 hours) does not satisfy the threshold criterion (i.e., 1440 hours). On the other hand, if the total estimated occupancy value is 1500 hours, then the memory sub-system 110 can relocate the data (i.e., all the data stored in the current data block) to a new data block.

In determining the total block POT value ($T_{BLOCK\ TOTAL}$) for the total estimated occupancy value, the memory sub-system 110 can determine how much POT has passed since the data is written onto or stored at the data block (e.g., POT time passed since data is written on a page of the data block for the first time given that no data has been written on any other pages of the data block). In an embodiment, the memory sub-system 110 can determine the current system POT hour ($T_{CURR\ SYS}$) (e.g., POT hour 2.5 in FIG. 2) and subtract the POT hour the data was stored (i.e., an initial block POT value; $T_{BLOCK\ INITIAL}$) (e.g., POT hour 0.5 in FIG. 2) to calculate total block POT value ($T_{BLOCK\ TOTAL}$) (e.g., POT hour 2).

Figure 3:
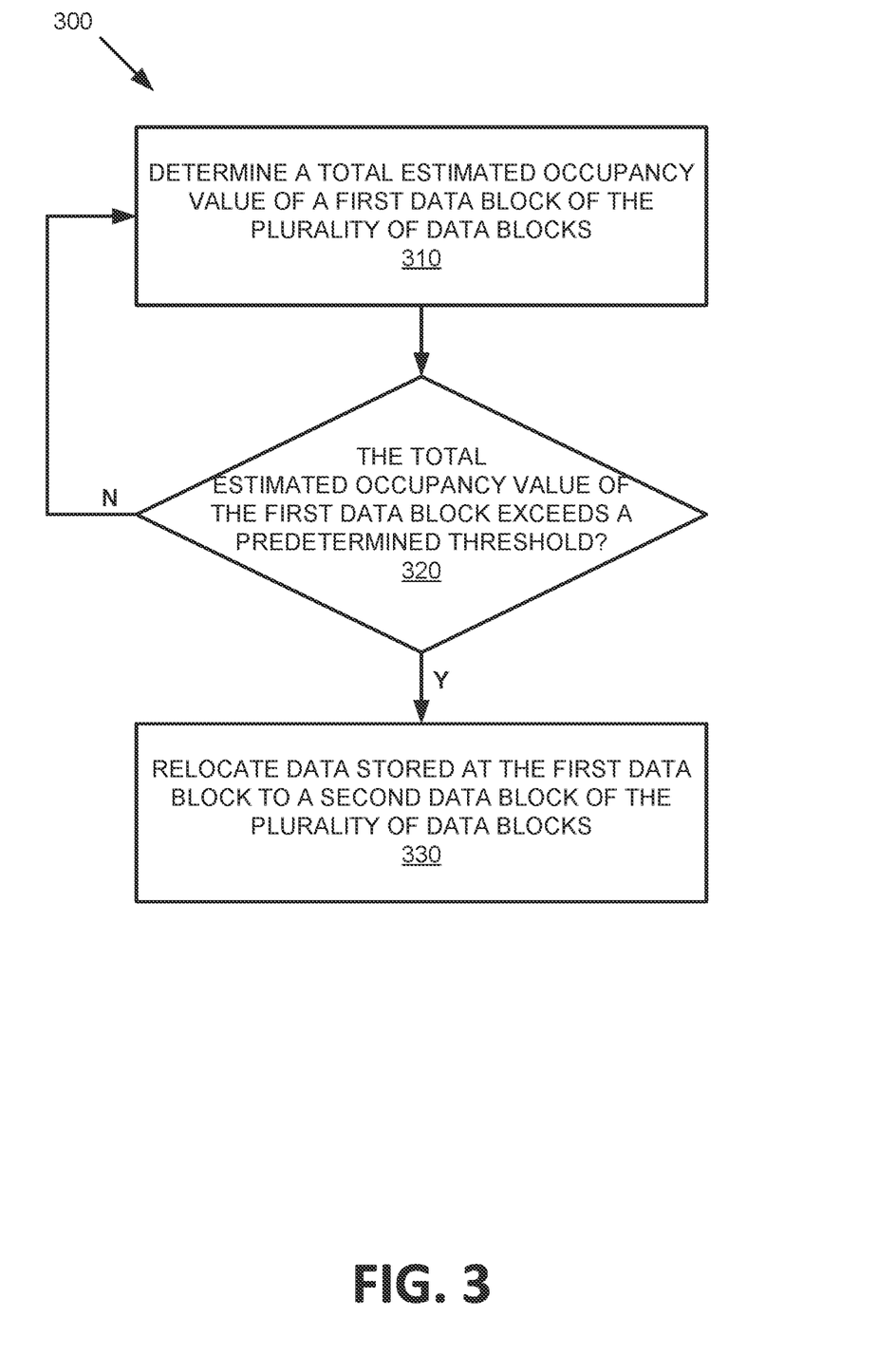
FIG. 3 is a flow diagram of an example method to relocate data stored on a data block based on a power-on-time value of a memory sub-system in accordance with some embodiments of the present disclosure.

FIG. 3 is a flow diagram of an example method 300 to relocate data stored at a data block based on a system POT value of a memory sub-system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the POT tracking component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device determines a total estimated occupancy value of a first data block of multiple data blocks in the memory sub-system 110. The processing device can determine the total estimated occupancy value on a periodic basis. A total estimated occupancy value is a value in a unit of time and represents an estimated time period of how long data has been stored at a data block. The total estimated occupancy value can represent the estimate time period for how long data has been written to a first page of the data block (i.e., how long the data has been first written onto the data block). In another example, the total estimate occupancy value can represent the estimated time period for how long data has been written to a last page of the data block (i.e., how long the data has been last written onto the data block). Accordingly, although the total estimated occupancy value is referred herein in terms of a data block, the value itself represents how long data has been stored on a first page or last page of the data block (among a plurality of pages). However, the total estimated occupancy value is used to decide whether or not all the data stored on the respective data block should be relocated. To determine the total estimated occupancy value of the first data block, the processing device can determine a total block POT value of the first data block and apply a scaling factor to the total block POT value.

A total block POT value is a value in a unit of time and represents a length of time in terms of a POT as to how long data has been stored on a data block (i.e., how much a system POT value has increased since the data was stored on the data block).

The processing device can determine the total block POT value of the first data block from an initial block POT value of the first data block and a current system POT value of the memory sub-system. As described above, the POT tracking component 113 counts a system POT value when the system is powered on but not when the system is powered off. Therefore, the total block POT value should be less than the total estimated occupancy value. The processing device can determine the total block POT value of the first data block on a periodic basis (e.g., every 12 hours or 24 hours system POT value, or every time there is a power-on event).

An initial block POT value is a value in a unit of time and represents a system POT value when data is written on a respective data block. The processing device can determine an initial block POT value of the first data block in response to receiving a request to write data on an initial page of the first data block. The initial page of the first data block can be a page out of all pages in the first data block where data is requested to be written for the first time ever. Accordingly, the processing device can identify a system POT value at the time of writing data on the first data block for the first time. In another example, the processing device can determine the initial block POT value of the first data block as a POT value of the memory sub-system 110 at the time of writing last data on the first data block (i.e., when data is being written on a last page of the first data block given that all other pages have already been written with data). In such a case, the processing device would determine the initial block POT value of the first data block in response to receiving a last request (i.e., a request to write last data, or write data on the last page of the first data block) to write data on the first data block. Further, the processing device can store the initial block POT value in association with the first data block at a buffer or a data store (e.g., local memory 119) so that the initial block POT value can later be queried in determining the total block POT value. Furthermore, the processing device can store the initial block POT value for each page in the first data block so that the processing device can relocate page by page based on a time period of how long data has been stored on each page and whether the time period satisfies a threshold criterion. In such case, the processing device can keep track of the time when it is requested to write data on each page for the first time as the initial block POT value.

The processing device can compute a difference between a current system POT value of the system and the initial block POT value of the first data block to determine the total block POT value of the first data block. The processing device can be configured to determine the total block POT value for each data block on a periodic basis.

The processing device can apply a scaling factor to the total block POT value to determine the total estimated occupancy value of the first data block. The scaling factor can correspond to a ratio of a total amount of time in a day to an expected amount of time for which the memory sub-system 110 is powered on. For example, it can be assumed that the memory sub-system 110 is powered-on 8 hours a day. Then, the scaling factor may be calculated to be 3 (i.e., a ratio of 24 to 8). As such, the scaling factor can be determined based on a usage pattern of the memory sub-system 110. In another embodiment, the scaling factor may be determined based on a type of use of the memory sub-system 110. For example, there can be two types of the uses—for a server at a data center or a client computer in a business setting. In case the memory sub-system 110 is used as part of a server system, the memory sub-system 110 would be powered-on 24 hours a day. Thus, the memory sub-system 110 can determine the scaling factor to be 1 (i.e., a ratio of 24 to 24). On the other hand, for a client computer, the memory sub-system 110 would be powered-on 8 hours a day, an average business operation hour. In such a case, the memory sub-system 110 can determine the scaling factor to be 3 (i.e., a ratio of 24 to 8). The same value can be used for the scaling factor across the multiple data blocks in the memory sub-system 110. As an example, the processing device can multiply the scaling factor with the total block POT value of the first data block to determine the total estimated occupancy value of the first data block as described above with reference to FIG. 2. As another example, the processing device can divide the total block POT value of the first data block by the scaling factor as described above with reference to FIG. 2.

At operation 320, the processing device can determine whether the total estimated occupancy value of the first data block satisfies a threshold criterion (e.g., a minimum of 1440 hours (2 months)). The processing device can determine a value used in the threshold criterion from a pre-configured default value. In another embodiment, the processing device can determine the value used in the threshold criterion that optimizes the number of P/E cycles required for the relocation of data blocks. In response to determining that the total estimated occupancy value of the first data block does not satisfy the threshold, the processing device proceeds to operation 310.

On the other hand, in response to determining that the total estimated occupancy value satisfies the threshold criterion, at operation 330, the processing device can relocate data (i.e., entire data) stored at the first data block to a second data block amongst multiple data blocks. The processing device can select a new or an empty data block (i.e., a data block that does not store any data) as the second data block for the relocation. Furthermore, the processing device can select a data block that has been written the least number of times.

In another example, there may be a number of data blocks (including the first data block) whose data should be relocated because their respective total estimated occupancy values have been determined to satisfy the threshold criterion. In such a case, the processing device can relocate data (i.e., entire data stored in a respective data block) from a portion (e.g., a 5%) of these data blocks at each operation. For example, the processing device can identify a subset of data blocks from the multiple data blocks in the memory sub-system 110. Each block in the subset would have a total estimated occupancy value that satisfies the threshold criterion. The subset of data blocks would include the first data block. Then, the processing device can relocate all the data stored in a first portion of the subset (i.e., a first group (e.g., a first 5%) of data blocks from the subset) in a first relocation operation and a second portion of the subset (i.e., a second group (e.g., the next 5%) of data blocks from the subset) in a second relocation operation. By relocating data in such a piece-wise manner, much less processing resources are required to move the data blocks in each relocation operation when compared to relocating data from all data blocks in the subset at once.

Figure 4:
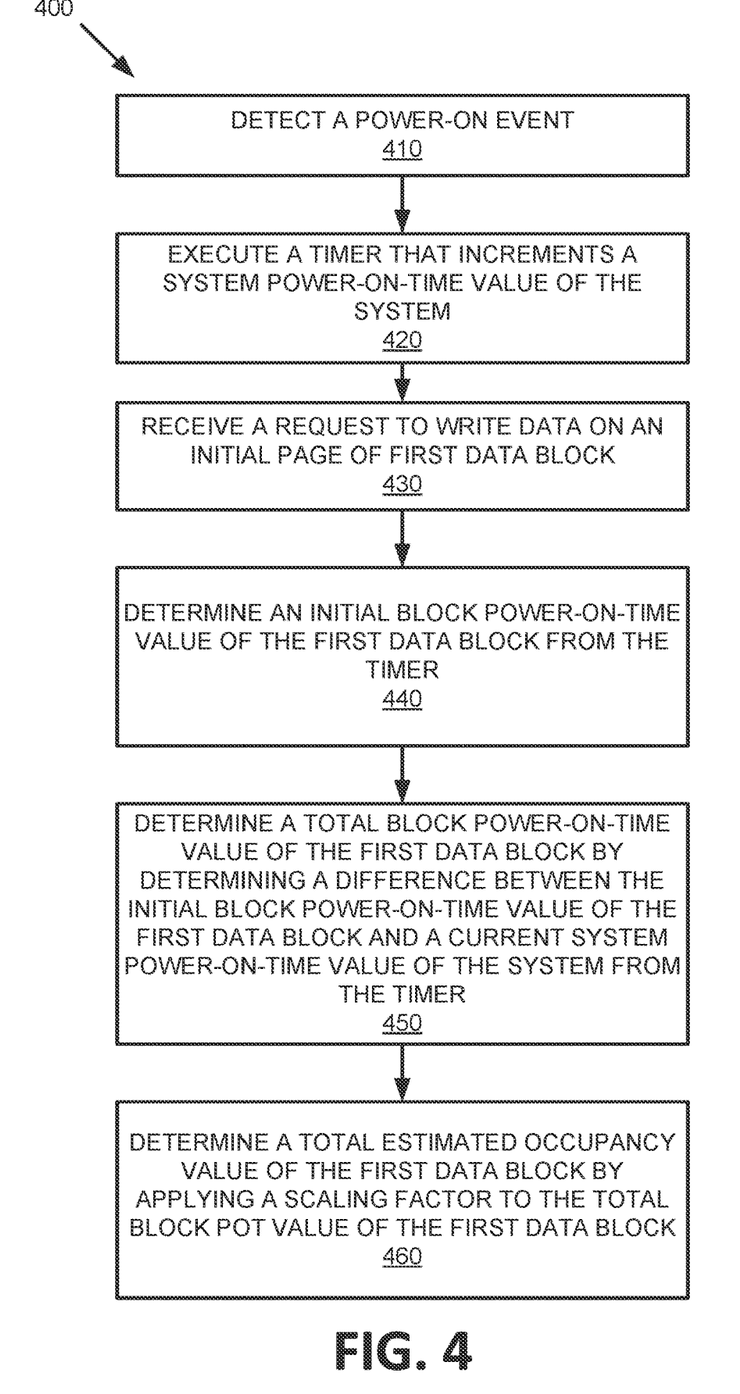
FIG. 4 is a flow diagram of an example method to determine a total estimated occupancy value of a data block, in accordance with some embodiments of the present disclosure.

FIG. 4 is a flow diagram of an example method 400 to determine a total estimated occupancy value of a data block, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the POT tracking component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device can detect a power-on event in the memory sub-system 110. The power-on event is an event that incurs when power is supplied to the memory sub-system 110 via the power source. At operation 420, the processing device can increment a POT timer representing a system POT value of the memory sub-system 110, responsive to detecting the power-on event. As an example, the processing device can trigger the POT timer to start counting from 0 in case of a first power-on event, or continue counting from the value previously left off. In this way, the POT timer can continue counting the system POT value since an occurrence of the last power-on event.

At operation 430, the processing device can receive a request to write a first data on an initial page (i.e., the first page in a plurality of pages) of a first data block among multiple data blocks in the memory sub-system 110. As described above with reference to operation 310, the request can be a request to write data on a data block for the first time. At operation 440, the processing device can determine an initial block POT value of the first data block form the POT timer, in response to receiving the request to write the first data on the first data block. The processing device can access the POT timer to obtain the current value for the initial block POT value. As described above, the current system POT value of the system is incremented when the memory sub-system 110 is powered on, but not incremented when the memory sub-system 110 is powered off.

At operation 450, the processing device can determine a total block POT value of the first data block by determining a difference between the initial block POT value of the first data block and a current system POT value of the system from the POT timer. The difference could represent how much POT has passed since the determination of the initial block POT value of the first data block. Accordingly, the total block POT value would represent how long the first data has been stored at the first data block in terms of the POT.

At operation 460, the processing device can determine a total estimated occupancy value of the first data block by applying a scaling factor to the total block POT value of the first data block. As described above with reference to operation 310, the scaling factor would correspond to a ratio of a total amount of time in a day to an expected amount of time for which the memory sub-system 110 is powered on. As an example, the processing device can apply the scaling factor by multiplying the scaling factor with the total block POT value of the first data block. As another example, the scaling factor can correspond to a ratio of an expected amount of time for which the memory sub-system 110 is powered on to a total amount of time in a day. In such example, the processing device can apply the scaling factor by dividing the total block POT value of the first data block by the scaling factor.

Further, responsive to determining that the total estimated occupancy value of the first data block satisfies the threshold criterion, the processing device can relocate the data stored on the first data block to a second data block of the plurality of data blocks as described above with reference to operation 330.

Figure 5:
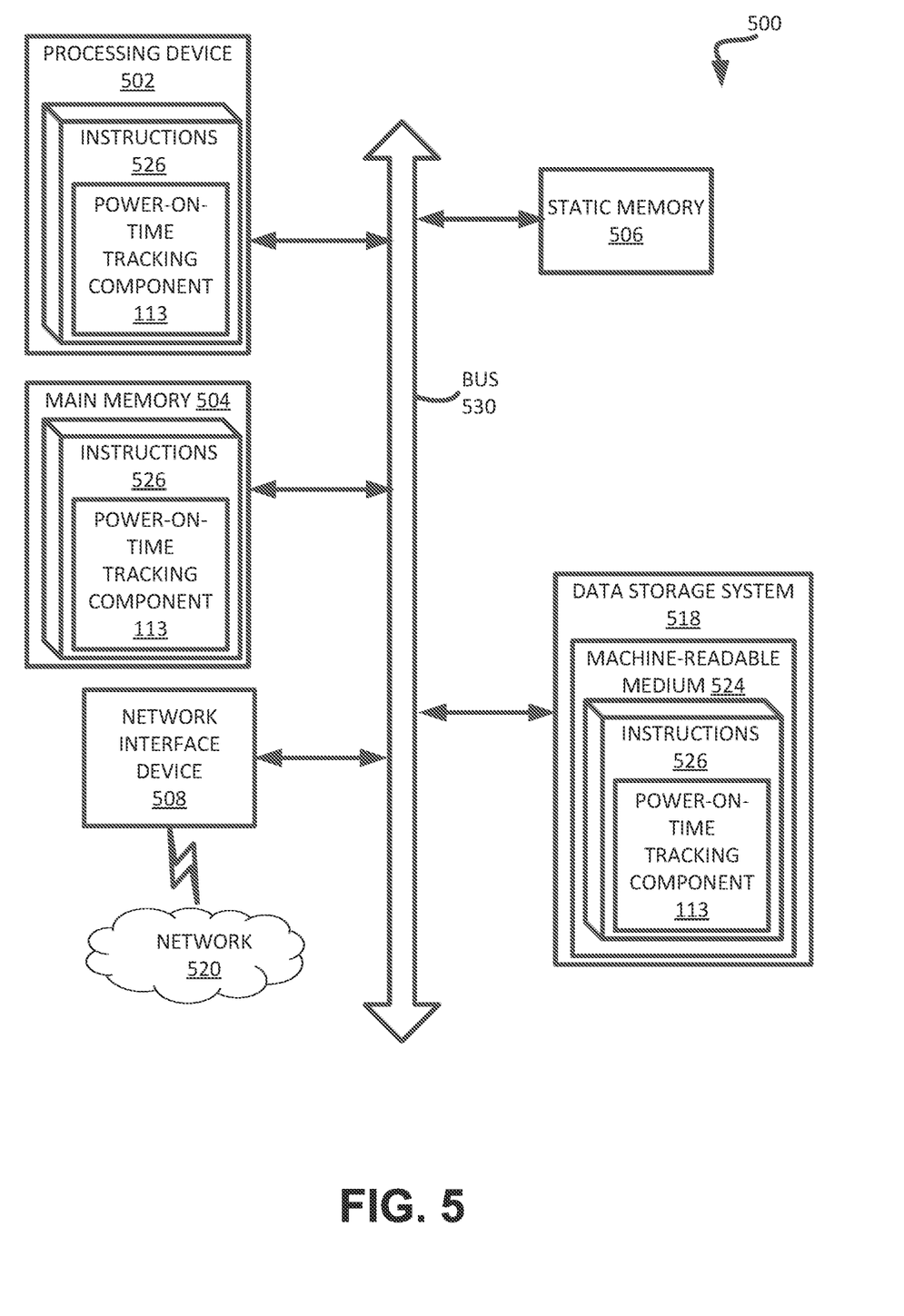
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the POT tracking component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a POT tracking component (e.g., the POT tracking component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of segments; and
a processing device, operatively coupled with the memory device, to perform operations comprising:
determining a total estimated occupancy value of a first segment of the plurality of segments of the memory device by applying a scaling factor to a total segment power-on-time (POT) value of the first segment, wherein the scaling factor is based on an expected amount of time for which the system is powered on during a given period of time, the total estimated occupancy value indicating how long data has been stored on the first segment;
determining whether the total estimated occupancy value of the first segment satisfies a threshold criterion; and
responsive to determining that the total estimated occupancy value of the first segment satisfies the threshold criterion, relocating the data stored on the first segment to a second segment of the plurality of segments of the memory device.

2. The system of claim 1, wherein the processing device is to perform operations further comprising:
responsive to receiving a request to write data on an initial page of the first segment, determining an initial segment POT value of the first segment, the first segment comprising a plurality of pages including the initial page.

3. The system of claim 2, wherein the processing device is to perform operations further comprising:
determining a difference between a current system POT value of the system and the initial segment POT value of the first segment.

4. The system of claim 3, wherein the current system POT value of the system is incremented when the system is powered on and is not incremented when the system is powered off.

5. The system of claim 1, wherein applying the scaling factor to the total segment POT value comprises multiplying the scaling factor for the plurality of segments with the total segment POT value of the first segment.

6. The system of claim 1, wherein the scaling factor comprises a ratio of an expected amount of time for which the system is powered on during the day to a total amount of time in a day.

7. The system of claim 6, wherein applying the scaling factor to the total segment POT value, if the scaling factor is a non-zero value, comprises dividing the total segment POT value of the first segment by the scaling factor for the plurality of segments.

8. A method comprising:
determining a total estimated occupancy value of a first segment of a plurality of segments of a memory device by applying a scaling factor to a total segment power-on-time (POT) value of the first segment, wherein the scaling factor is based on an expected amount of time for which a system is powered on during a given period of time, the total estimated occupancy value indicating how long data has been stored on the first segment;
determining whether the total estimated occupancy value of the first segment satisfies a threshold criterion; and
responsive to determining that the total estimated occupancy value of the first segment satisfies the threshold criterion, relocating the data stored on the first segment to a second segment of the plurality of segments of the memory device.

9. The method of claim 8, further comprising:
responsive to receiving a request to write data on an initial page of the first segment, determining an initial segment POT value of the first segment, the first segment comprising a plurality of pages including the initial page.

10. The method of claim 9, further comprising:
determining a difference between a current system POT value of the system and the initial segment POT value of the first segment.

11. The method of claim 10, wherein the current system POT value of the system is incremented when the system is powered on and is not incremented when the system is powered off.

12. The method of claim 8, wherein applying the scaling factor to the total segment POT value comprises multiplying the scaling factor for the plurality of segments with the total segment POT value of the first segment.

13. The method of claim 8, wherein the scaling factor comprises a ratio of an expected amount of time for which the system is powered on during the day to a total amount of time in a day.

14. The method of claim 13, wherein applying the scaling factor to the total segment POT value, if the scaling factor is a non-zero value, comprises dividing the total segment POT value of the first segment by the scaling factor for the plurality of segments.

15. A non-transitory computer-readable storage medium comprising instructions that, when executed by a processing device, cause the processing device to perform operations comprising:
    determining a total estimated occupancy value of a first segment of a plurality of segments of a memory device by applying a scaling factor to a total segment power-on-time (POT) value of the first segment, wherein the scaling factor is based on an expected amount of time for which a system is powered on during a given period of time, the total estimated occupancy value indicating how long data has been stored on the first segment;
    determining whether the total estimated occupancy value of the first segment satisfies a threshold criterion; and
    responsive to determining that the total estimated occupancy value of the first segment satisfies the threshold criterion, relocating the data stored on the first segment to a second segment of the plurality of segments of the memory device.

16. The non-transitory computer-readable storage medium of claim 15, wherein the instructions cause the processing device to perform operations further comprising:
    responsive to receiving a request to write data on an initial page of the first segment, determining an initial segment POT value of the first segment, the first segment comprising a plurality of pages including the initial page.

17. The non-transitory computer-readable storage medium of claim 16, wherein the instructions cause the processing device to perform operations further comprising:
    determining a difference between a current system POT value of the system and the initial segment POT value of the first segment.

18. The non-transitory computer-readable storage medium of claim 17, wherein the current system POT value of the system is incremented when the system is powered on and is not incremented when the system is powered off.

19. The non-transitory computer-readable storage medium of claim 15, wherein applying the scaling factor to the total segment POT value comprises multiplying the scaling factor for the plurality of segments with the total segment POT value of the first segment.

20. The non-transitory computer-readable storage medium of claim 15, wherein the scaling factor comprises a ratio of an expected amount of time for which the system is powered on during the day to a total amount of time in a day, and wherein applying the scaling factor to the total segment POT value, if the scaling factor is a non-zero value, comprises dividing the total segment POT value of the first segment by the scaling factor for the plurality of segments.

* * * * *